May 21, 1940. W. L. ALLISON Des. Re. 21,452
LAMP STANDARD
Original Filed April 17, 1939
Fig. 1,
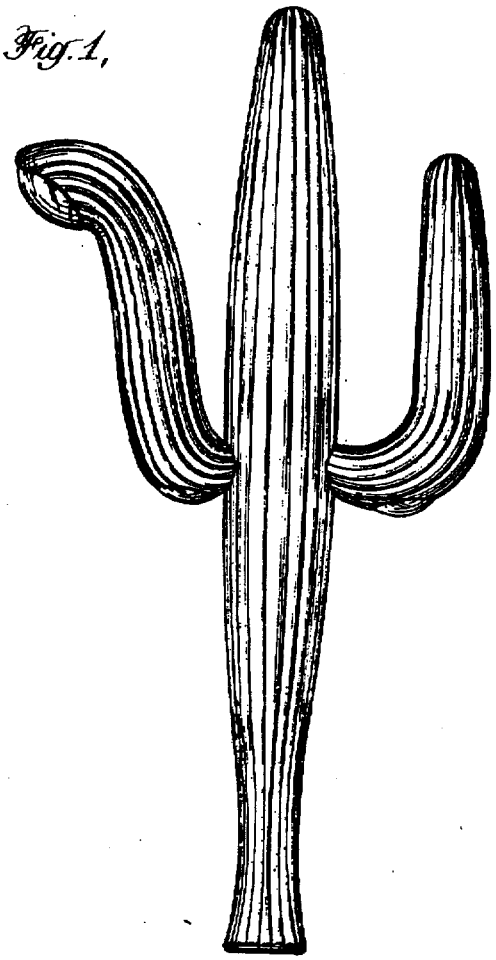
Fig. 2.
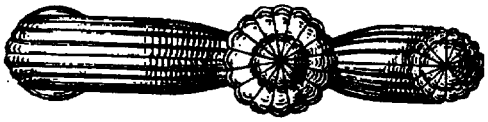
INVENTOR
William L. Allison
BY
Pennie Davis Marvin & Edmonds
ATTORNEYS Reissued May 21, 1940

Des. Re. 21,452

UNITED STATES PATENT OFFICE 21,452

DESIGN FOR A LAMP STANDARD

William L. Allison, Phoenix, Ariz.

Original No. 118,358, dated January 2, 1940, Serial No. 84,336, April 17, 1939, for 3½ years. Application for reissue February 7, 1940, Serial No. 90,139. Term of patent 14 years

*To all whom it may concern:*

Be it known that I, William L. Allison, a citizen of the United States, residing at Phoenix, county of Maricopa and State of Arizona, have invented a new, original, and ornamental Design for a Lamp Standard, of which the following is a specification, reference being had to the accompanying drawing, forming part thereof.

Fig. 1 is a side elevational view of a lamp standard showing my new design; and

Fig. 2 is a top plan view therof.

I claim:

The ornamental design for a lamp standard, substantially as shown.

W. L. ALLISON.